Dec. 30, 1952  A. P. GROVER  2,623,242
CURING PRESS

Filed July 22, 1950  3 Sheets-Sheet 1

INVENTOR.
ANTHONY P. GROVER
BY
Oberlin & Limbach
ATTORNEYS.

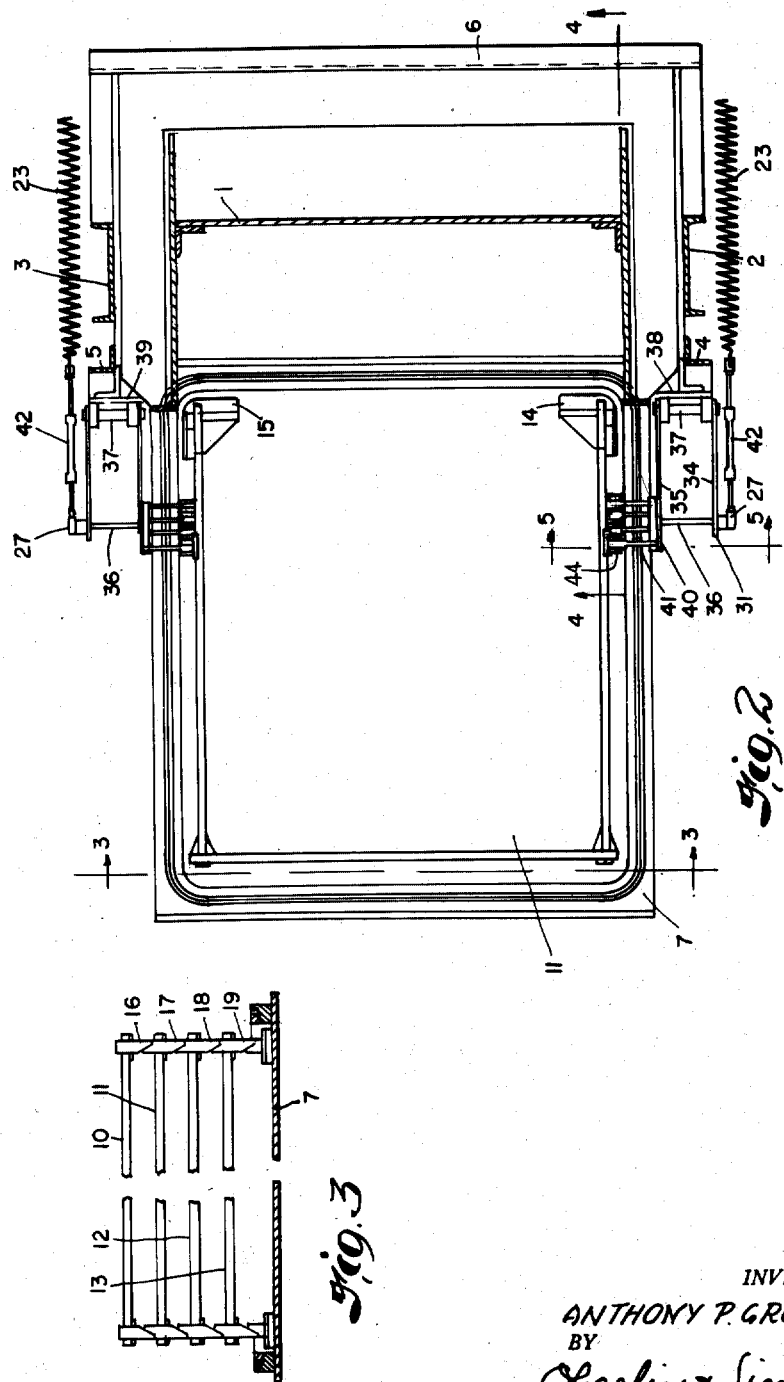

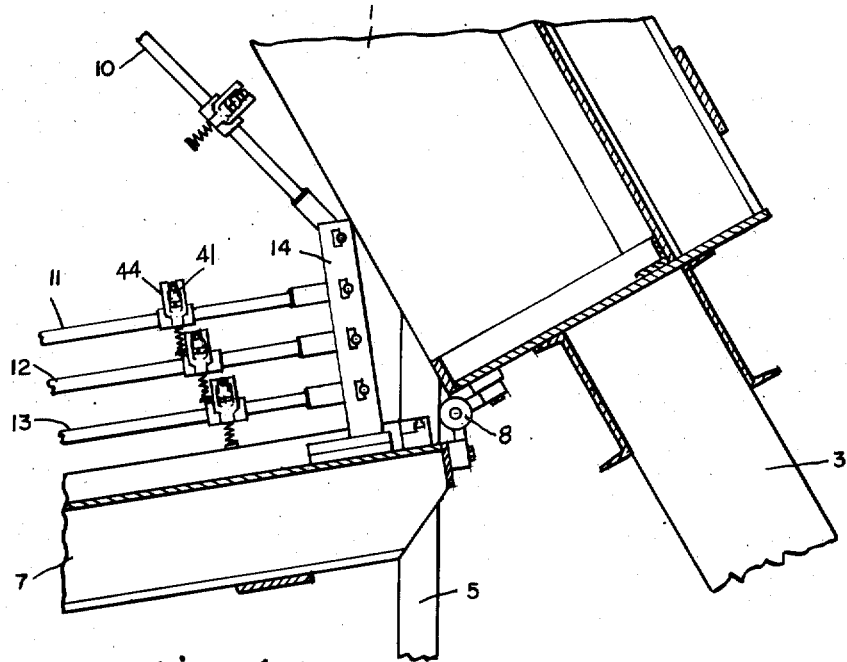
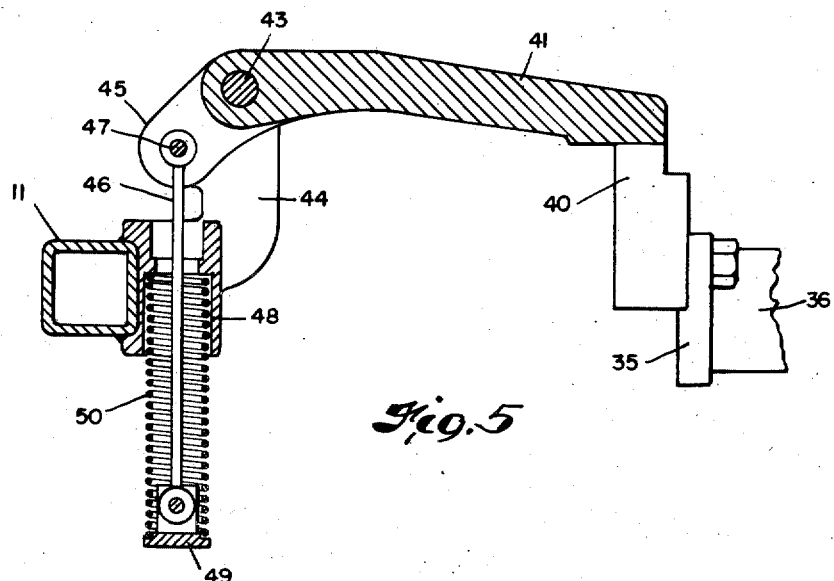

Patented Dec. 30, 1952

2,623,242

UNITED STATES PATENT OFFICE 2,623,242

CURING PRESS

Anthony P. Grover, Willoughby, Ohio, assignor to The Ohio Rubber Company, Willoughby, Ohio, a corporation of Delaware Application July 22, 1950, Serial No. 175,403

11 Claims. (Cl. 18—19)

This invention relates as indicated to a curing press and, more partiularly, to a curing press or oven designed for the curing of rubber mats and the like.

In one form of curing oven which has been in commercial use for some time and has proven very satisfactory, the oven proper comprises a large steam chest inclined at an angle of about 30° to the vertical, the lower of the two inclined sides thereof being openable by means of a door hingedly connected thereto at the lower edge thereof. Such door is thus adapted to swing downwardly and outwardly to a generally horizontal position with the racks carrying the molded rubber mats or the like resting thereon. A series of large generally flat molds will ordinarily be stacked one upon the other and pivotally connected to an extension of such door so that a plurality of mats may be molded and cured simultaneously. It has been conventional to provide elaborate counterbalancing means for such pivotally mounted "leaves," ordinarily comprising large tension springs contained within the curing chest and secured to a lateral edge of each "leaf" respectively. When the door of the chest has been dropped down, with the rack of mold leaves resting thereon, an operator is thus enabled to swing up such leaves one at a time in order to expose the next underlying mold and permit removal of a molded and cured mat therefrom. Such molds are then cleaned and sheets of uncured rubber stock placed thereon, beginning with the lowermost mold and bringing down the next upper mold leaf in succession until a sheet of uncured stock has been placed on each mold and the mold leaves comprising the complete rack are now stacked one upon the other and resting on the oven door. In this type of curing press, suction is ordinarily applied at the mold surfaces to draw the relatively thin uncured rubber stock against the respective mold surfaces. The oven door is then closed, and steam is admitted to such curing oven or steam chest to cure the molded mats.

As above indicated, curing ovens or presses of the type described are conventional and the present invention relates only to an improvement in the means employed to support the individual mold leaves when the oven has been opened. The operator, of course, must obtain access to the various leaves comprising the mold rack in order to remove the cured mats therefrom and to place the sheets of uncured rubber on the respective mold surfaces. Tension springs have previously been employed within such curing ovens engaging the opposite sides of the individual mold leaves and tending to counterbalance the same so that the operator might swing the same upwardly one at a time out of the way to obtain access to the underlying mold leaves. When such leaves were brought into position parallel to the open, slightly downwardly inclined, door of the oven, the tension exerted by such springs thereon was sufficiently in the direction of the pivotal mountings of the mold leaves to be ineffective to elevate the latter. In other words, something of a toggle effect was obtained, assisted by the weight of such mold leaves themselves. When the operator manually swung the individual leaves upwardly into a position more nearly parallel to that of the oven, however, the tension springs were effective to maintain the mold leaves in such elevated position until the operator was ready to pull them down.

The provision of such counterbalancing springs within the oven or curing chamber of course prevented utilization of the full capacity of such chamber and reduced the size of the mold which might be employed therein. Being subjected to the repeated action of hot steam, the springs, moreover, tended to fail prematurely and replacement was both inconvenient and entailed expensive down time. Moreover, it has occasionally happened that the jar of closing the oven door together with the tension of a somewhat too powerful spring has acted to overbalance the uppermost mold leaf of the rack to cause the same to swing upwardly into the rear of the curing chamber where it may jam when the door is next opened.

It is accordingly a principal object of my invention to provide curing press mechanism including external means operative to counterbalance the individual leaves of a mold rack when such curing press has been opened.

It is a further object to provide such counterbalancing mechanism which will automatically engage the individual mold leaves as the curing press opens and which will be automatically disengaged from the same when the press closes. As a result, no elaborate sealing means will be required for that portion of the mechanism connecting the individual leaves to the counterbalancing means.

Another object is to provide such counterbalancing means which will be out of the way of the operator and will require a minimum of attention and maintenance.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is a top plan view of such curing press;

Fig. 3 is a fragmentary sectional view taken along the line 3—3 on Fig. 2;

Fig. 4 is a fragmentary vertical sectional view taken on the line 4—4 on Fig. 2;

Fig. 5 is a vertical sectional detail view taken on the line 5—5 on Fig. 2; and

Figure 1:
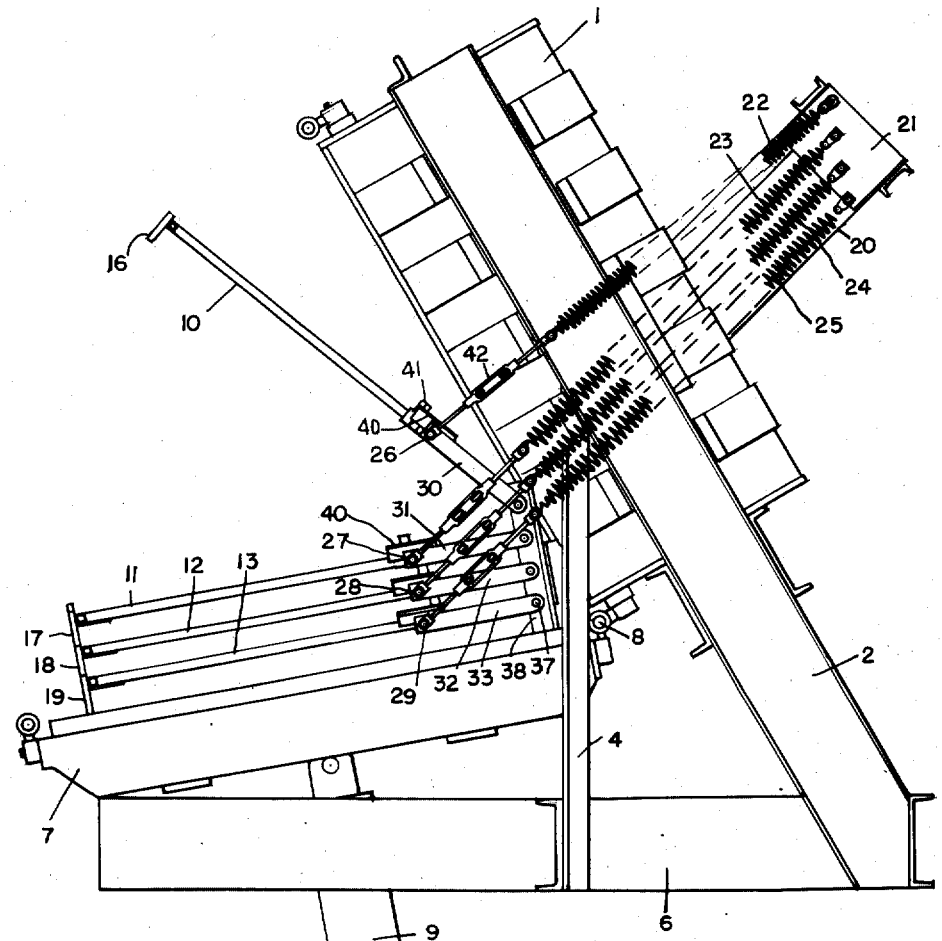
Fig. 1 is a side elevational view of a typical curing press of the type in question having my new counterbalancing mechanism mounted thereon.

Referring now more specifically to said drawing and especially Figs. 1 and 2 thereof, the conventional curing press (also known as an "Alligator Heater") comprises a box-like insulated chest or oven 1 supported at an angle of about 30° to the vertical by means of side frame members 2 and 3 and vertical struts 4 and 5 welded to base 6. The downwardly inclined side of such curing chamber is provided with a door 7 hinged at 8 to the lower edge thereof and adapted to make an airtight seal when swung up into closed position. An hydraulic fluid pressure piston-cylinder assembly 9 will ordinarily be employed to operate such door. The curing chamber is, of course, provided with the usual steam lines for the purpose of admitting steam thereto to effect the curing of rubber mats or the like therein.

A plurality of mold leaves 10, 11, 12, and 13 are pivotally secured to uprights 14 and 15 on the inner side of door 7 adjacent hinge 8, spacer means 16, 17, 18, and 19 being provided adjacent the forward edges of the respective mold leaves to support the latter in generally parallel position on door 7. Due to the inclination of curing chamber 1, this relationship of the mold leaves to each other and to door 7 will normally be maintained even when such door is swung up into closed position. The mold leaves are hollow and are provided with a mold surface on their upper sides. When a sheet of uncured rubber stock has been placed on such mold surface, vacuum may be applied to the underside thereof through small apertures in such surface leading to the hollow interior of the leaf to draw the uncured rubber stock into close molding engagement with such surface. As indicated, this form of molding means, the vacuum lines leading thereto and like details, are all old in the art and form no part of this invention.

For the reasons explained above, the usual prior art counterbalancing means comprising tension springs mounted within the curing chamber have proven far from satisfactory, and I have accordingly developed the mechanism described below whereby tension springs for this purpose may be mounted exteriorly of the curing chamber.

Extending upwardly and rearwardly from inclined frame members 2 and 3 are brackets 20 carrying a pair of plates 21 disposed to each side of the press. A plurality of elongated tension springs 22, 23, 24, and 25 corresponding to the number of mold leaves are pivotally secured to each such plate, the attaching means preferably permitting a degree of swiveling movement about horizontal axes. As best shown in Figs. 1 and 2, each of such springs 22, 23, 24, and 25 is pivotally secured at 26, 27, 28, and 29 respectively to corresponding lever arms 30, 31, 32, and 33. Such lever arms comprise two parallel members 34 and 35 rigidly interconnected near their outer extremities by means of crossbar 36 and pivotally mounted at 37 on side brackets 38 and 39 welded to the respective struts 4 and 5 of the curing press frame. Such members 38 and 39 are slightly inclined to correspond to the tilt of door 7 when the latter is in open position so that the axes of such pivots 37 of the series of lever arms thus pivotally mounted on each side of the press may automatically be aligned with the respective pivotal connections of the several mold leaves where the latter are hingedly mounted on uprights 14 and 15. In other words, each pair of such lever arms to either side of the press may be caused to swing on an arc about its pivot 37 in exact parallelism with a respective intervening mold leaf.

Each lever arm carries a wear plate 40 adapted to engage a finger 41 extended from a respective mold leaf, whereby such mold leaves may be supported by the respective pairs of lever arms to either side thereof, the latter in turn being resiliently supported by the aforesaid tension springs. Turn buckles 42 may be provided for such springs to permit adjustment of the tension of the same.

Figure 6:
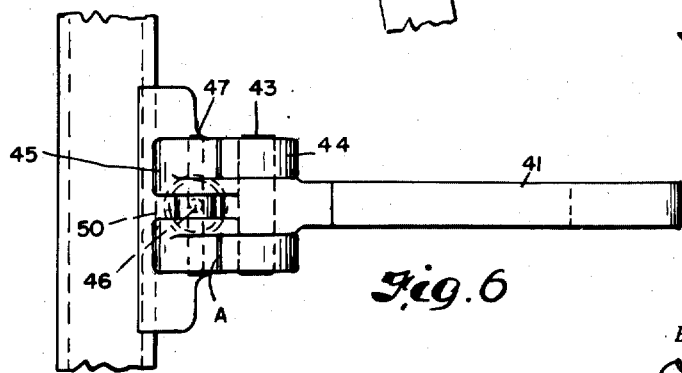
Fig. 6 is a detail top plan view of a mold leaf finger shown in Fig. 5.

Referring now more especially to Fig. 5 of the drawing, the lever-engaging fingers 41 are pivotally mounted at 43 on upstanding bifurcated brackets 44 welded to the side frame portions of the individual mold leaves. Inward extensions 45 of such fingers are adapted to engage the inner face of bracket 44 at A (Fig. 6) when finger 41 has been swung up into horizontal position as shown in Fig. 5 so that such fingers are adapted to support the weight of the mold leaf when resting on wear plates or ledges 40. A tension rod 46 is pivotally secured at 47 to extension 45 of finger 41 and passes through an opening 48 cored in the base of bracket 44 and carries a cap 49 at its other extremity. A compression spring 50 surrounds such rod 46 engaging cap 49 and seated at its other end in the base of bracket 44. It will thus be seen that such compression spring is effective to exert a pull on the inward extension 45 of finger 41 tending to rock the latter in a counterclockwise direction as viewed in Fig. 5 until such finger is brought into laterally extended position as there shown whereupon engagement of extension 45 with bifurcated bracket 44 takes place and the finger rigidly supports the lifting pull exerted at its extremity by wear plate 40 on the spring actuated lever arm. The top of bifurcated bracket 44 is rounded to permit finger 41 to swing downwardly about its pivot 43, but upward swinging of such finger beyond the position shown in Figs. 5 and 6 is prevented by such rearward extensions 45 of the finger engaging the back side of such bracket, as above indicated.

The operation of my new mechanism may now be readily understood. When door 7 is swung upwardly into closed position, the fingers 41 on the respective mold leaves will successively engage the side edges of curing chamber 1 and be folded inwardly thereby against the action of compression springs 50. The two set of tension springs 22, 23, 24 and 25 on either side of the curing press will be adjusted so that the lever arms respectively supported thereby, and consequently the wear plates 40 on such lever arms, will not follow their corresponding fingers 41 all the way to the entry of the latter into the curing chamber. As best shown in Figs. 1 and 4, the fingers 41 of the respective mold leaves are not mounted exactly one above the other, but are slightly displaced to avoid interference by compression springs 50.

After completion of the curing operation, door 7 will now be swung slowly downwardly with the rack of mold leaves resting thereon. As leaf 13 first emerges from the curing chamber, the pair of fingers 41 carried thereby will swing outwardly as soon as permitted by the sides of such chamber into position to engage the wear plates 40 of the waiting pair of lever arms 33. The path of movement of such fingers 41 is through an arc having hinge 8 as the center, so that it will be seen that the extended fingers of leaf 13 will engage only ledge or wear plate 40 of tension spring supported lever arms 33, all such arms and springs being in a position generally parallel to that of lever arm 30 and spring 22 as shown in Fig. 1 when the door is closed. As each successive mold leaf emerges from the curing chamber, it similarly swings out its pair of fingers into position to engage the corresponding waiting lever arms. Consequently, all of the leaves will now be held in open, spaced apart, relation.

The operator next pulls down the lowermost mold leaf 13 to Fig. 1 position, overbalancing spring 25 which is less effective in its direction of pull when such leaf is in this position, removes the cured mat, and cleans the mold. This operation is repeated with each mold leaf. An uncured blank of sheet rubber stock is placed on each mold after the same has been thus cleaned, so that the stack of mold leaves will now rest on door 7, each with an uncured blank thereon. Door 7 will now again be closed, the fingers and spring-supported levers being disengaged as before. Suction is applied at the mold surfaces to mold the sheets and steam admitted to the curing chamber to cure the same.

It will thus be seen that I have provided mold leaf supporting means which is automatically operative when the curing chamber door is opened but which is largely disposed outside such chamber so that valuable internal mold space is not wasted. The mechanism is rugged, requiring little maintenance, and is completely disengaged when the door is closed so that no special sealing means are required.

Other modes of applying the principle of the invention may be employed, change being made as regards the details described, provided the features stated in any of the following claims or the equivalent of such be employed.

I therefore particularly point out and distinctly claim as my invention:

1. In combination with a curing press having an inclined curing chamber, a door for the lower inclined side of such chamber hingedly mounted at its lower edge for downward opening movement, and a stack of superimposed mold leaves adapted to be supported on the upper surface of such door when the latter has been swung open into generally horizontal position and individually pivotally connected to such door adjacent such hinge for swinging movement about axes parallel to the axis of such hinge, whereby each such mold leaf may be swung up to expose the leaf thereunder, such stack of mold leaves being carried into such chamber by such door when the latter is swung upwardly into closed position; mold leaf supporting means comprising a plurality of tension springs disposed to each side of said press in vertical tiers and secured at one end to fixed brackets extending rearwardly of such chamber, the other ends of said springs being secured to respective lever arms pivotally mounted adjacent such door in similar vertical arrangement, whereby said springs tend to swing said lever arms upwardly, the axes of pivotal mounting of corresponding pairs of said lever arms on opposite sides of said press being in alignment with the axes of pivotal mounting of respective mold leaves of such intervening stack when said door is in fully opened position, wear plates on said lever arms, and extensible fingers on each side of each such mold leaf adapted when extended to rest upon said wear plate of a corresponding said lever arm, said fingers being variously spaced outwardly from the pivotal mountings of the respective mold leaves thus to engage only the wear plates of their corresponding lever arms, and said fingers being pivotally mounted on the side edges of said mold leaves for swinging movement between a horizontally extended position and a downwardly folded position closely alongside said mold leaves, stop means preventing upward swinging movement of said fingers beyond such extended position, and resilient means urging said fingers to extended position, whereby, when such door is closed, carrying such mold leaves into such chamber, said pairs of fingers will successively engage the corresponding sides of said chamber and be folded closely against the respective mold leaves, and when such door is again opened said pairs of fingers will successively be released from such chamber and swing outwardly under the influence of said resilient means to engage said respective lever arms resiliently to support said mold leaves by said tension springs.

2. In combination with a curing press having an inclined curing chamber, a door for the lower inclined side of such chamber hingedly mounted at its lower edge for downward opening movement, and a stack of superimposed mold leaves adapted to be supported on the upper surface of such door when the latter has been swung open into generally horizontal position and individually pivotally connected to such door adjacent such hinge for swinging movement about axes parallel to the axis of such hinge, whereby each such mold leaf may be swung up to expose the leaf thereunder, such stack of mold leaves being carried into such chamber by such door when the latter is swung upwardly into closed position; mold leaf supporting means comprising a plurality of tension springs disposed to each side of said press in vertical tiers and secured at one end to fixed supports, a plurality of lever arms pivotally mounted adjacent such door in similar vertical arrangement, the other ends of said springs being secured to said respective arms resiliently to support the same normally at an upwardly inclined angle, the axes of pivotal mounting of corresponding pairs of said lever arms on opposite sides of said press being in alignment with the axes of pivotal mounting of respective mold leaves of such intervening stack when said door is in fully opened position, and extensible fingers on each side of each such mold leaf adapted when extended to rest upon a corresponding lever arm, said fingers being arranged thus to engage their corresponding lever arms only, and said fingers being pivotally mounted on the side edges of said mold leaves for swinging movement between a horizontally extended position and a downwardly folded position closely alongside said mold leaves, stop means preventing upward swinging movement of said fingers beyond such extended position, and resilient means urging said fingers to extended position, whereby, when such door is closed, carrying such mold leaves into such chamber, said pairs of fingers will successively engage the corresponding sides of said chamber and be folded closely against the respective mold leaves, and when such door is again opened said pairs of fingers will successively be released from such chamber and swing outwardly under the influence of said resilient means to engage said respective lever arms resiliently to support said mold leaves by said tension springs.

3. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement whereby access may be had to underlying leaves; individual leaf supporting means comprising pairs of lever arms respectively pivotally mounted to either side of such door for swinging movement about axes parallel to the axes of pivotal mounting of such leaves, one said pair of lever arms being provided for each such leaf, resilient means tending to swing said arms upwardly, and pairs of extensible fingers on the sides of such respective mold leaves adapted when extended to rest on said corresponding lever arms resiliently to support such leaves in elevated spaced apart position, said fingers being pivotally mounted on said leaves for swinging movement down alongside the latter, resilient means tending to swing said fingers outwardly into extended position, and stop means preventing upward swinging movement of said fingers beyond such extended position, whereby, when such door is closed, carrying such mold leaves into such chamber, said pairs of fingers will successively engage the corresponding sides of said chamber and be folded closely against the respective mold leaves, and when such door is again opened said pairs of fingers will successively be released from such chamber and swing outwardly under the influence of said latter resilient means to engage said respective lever arms resiliently to support such mold leaves in elevated spaced apart position.

4. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement whereby access may be had to underlying leaves; lever arms pivotally mounted on each side exteriorly of such curing chamber for swinging movement with such respective mold leaves, extensible fingers on such mold leaves adapted when extended to engage said respective lever arms to support such leaves thereby, resilient means supporting said respective lever arms, and resilient means urging said fingers to extended position, said fingers being mounted for retraction upon engagement of the same with the side of such chamber as such door is closed.

5. In combination with a curing press having a curing chamber and a mold pivotally mounted adjacent its lower edge to swing outwardly and downwardly from within such chamber and to be similarly returned thereto, resilient supporting means disposed laterally exteriorly of such chamber, and a lateral extension on such mold adapted to engage said resilient supporting means to support said mold when the latter has been thus swung out of such chamber, said lateral extension being mounted for retraction out of position to engage said supporting means by engagement with such chamber upon returning such mold thereto.

6. In combination with a curing press having a curing chamber and a mold pivotally mounted adjacent its lower edge to swing outwardly and downwardly from within such chamber and to be similarly returned thereto; resilient supporting means disposed laterally exteriorly of such chamber, a laterally projecting and retractable extension on such mold engageable with said resilient supporting means to support said mold when the latter has been thus swung out of such chamber, and means operative automatically to retract said extension toward such mold in timed relation to swinging movement of such mold when such mold is retuurned into such chamber to permit said extension to be enclosed within such chamber.

7. In combination with a curing press having a curing chamber and a mold pivotally mounted adjacent its lower edge to swing outwardly and downwardly from within such chamber and to be similarly returned thereto; resilient supporting means disposed exteriorly of such chamber, an extension on such mold adapted to engage said supporting means to support such mold when the latter has been thus swung out of such chamber, said extension being mounted for inward movement, and resilient means urging said extension outwardly into support-engaging position, whereby, when such mold is swung back into such chamber, such extension will be cammed back against the action of said last-named resilient means by engagement with such chamber so that such mold and said extension may enter within such chamber.

8. In combination with a curing chamber having a mold mounted for swinging movement into and out of the same; a retractable extension on such mold, resilient supporting means externally of such chamber engageable with said extension to support such mold when the latter has been thus swung out of such chamber, means operative to hold said extension in extended position when such mold is outside such chamber, and means operative to retract said extension in timed relation to swinging movement of said mold into such curing chamber.

9. In combination with a curing chamber having a mold mounted for swinging movement into and out of the same; a retractable extension on such mold, supporting means externally of such chamber engageable with said extension to support such mold when the latter has been thus swung out of such chamber, said extension being mounted for retraction toward such mold to permit said extension to be enclosed within such chamber when such mold is swung therein, and means operative to extend said projection when such mold leaves such chamber.

10. In combination with a curing chamber having a mold mounted for swinging movement into and out of the same; supporting means for such mold externally of such chamber, extensible means on such mold engageable with said supporting means to support such mold when such mold has been swung out of such chamber, and means mounting said extensible means for retraction within the bounds of such chamber when such mold is swung therein and for extension beyond the bounds of such chamber when such mold is swung out of the same.

11. In combination with a curing chamber having a mold mounted for swinging movement into and out of the same; supporting means for such mold externally of such chamber, and extensible means on such mold engageable with said supporting means to support such mold when such mold has been swung out of such chamber, said extensible means being mounted normally to project beyond the bounds of such chamber but pivotally mounted on such mold to swing inwardly theretoward upon engagement with such chamber when such mold is returned therein to permit said extensible means to be included within such chamber.

ANTHONY P. GROVER.

REFERENCES CITED

The following references are of record in the file of this patent:

UNITED STATES PATENTS

| Number | Name | Date |
|---|---|---|
| 2,134,364 | Gluogie | Oct. 25, 1938 |
| 2,233,174 | McDonald | Feb. 25, 1941 |